INVENTOR
G. J. BOEHM
BY
ATTORNEY 3,439,125
SELF-SEEKING GLASS REED RELAY MATRIX SELECTION SYSTEM

Guenter Joachim Boehm, Emerson, N.J., assignor to International Telephone and Telegraph Corporation, a corporation of Maryland Filed June 11, 1965, Ser. No. 463,224
Int. Cl. H04m 3/00; H04q 1/18
U.S. Cl. 179—18 17 Claims

ABSTRACT OF THE DISCLOSURE

Self-seeking path selecting circuitry using glass reed relay crosspoints in end-marked multi-stage matrices having "AND" circuitry at the center stage. The network requires a double wound glass reed relay at each crosspoint of the matrices with one winding being used for fanning out the end-marking and the other winding being used for maintaining and holding the path.

This invention relates to electrical switching systems and more particularly to glass reed matrices which may be electronically controlled.

Traditional electrical switching networks have utilized electromechanical components such as stepping switches, crossbar switches, or the like. More recently, switching networks have been constructed from electronic components using solid state crosspoints. However, present day solid state crosspoint components have tended to be limited by their own inherent characteristics. Thus, some type of signals cannot be sent through such networks. For example, high voltage telegraph signals could cause disturbing transients which might result in false operations.

A network of glass reed contacts provides an alternative which avoids the problems of electromechanical crosspoints and yet exhibits the desirable characteristics of solid state crosspoints. These glass reed contacts are especially well adapted to be controlled by an electronic computer-like control circuit. However, heretofore the glass reed contacts have not allowed the same degree of network sophistication that is available from solid state components. One of these sophistications is sometimes described as a self-seeking network.

A self-seeking network utilizes an array of crosspoints having inlets on one side and outlets on the other side. If end markings of opposite polarities are applied to an inlet and an outlet, a number of crosspoints close and complete a switch path from one end marking across the network to the other end marking. In a self-seeking network, the crosspoint selection is guided only by chance and crosspoint availability—free of controls which are external to the network.

When attempts have been made to provide self-seeking networks of glass reed contacts, the networks have tended to become unduly complex.

Accordingly, an object of the invention is to provide a new and improved glass reed network. In particular, an object is to provide glass reed networks which may be completely self-seeking when it is economical to do so. A further object is to provide low cost, glass reed networks which are completely self-seeking in smaller networks and virtually self-seeking in larger networks.

Another object of the invention is to provide a glass reed switching matrix which can be controlled by an electronic switching system. In this connection, an object is to provide a glass reed matrix-electronic switching system combination at a minimum cost for the total combination. That is, an object is to provide a low cost small matrix system combination design which may be enlarged to become a large matrix system combination design without encountering a discontinuity caused by a change in the scale of economy for the combination.

In keeping with one aspect of the invention, these and other objects are accomplished by a plurality of cascaded matrices, each matrix being made from intersecting horizontal and vertical busses. A crosspoint, in the form of a series circuit, including the windings of a glass reed crosspoint and diode, is connected across each of these intersections. This way, an application of end-marking potentials at opposite sides of the network causes a fan out of potentials. The fan out begins at the end marked points and extends through the network toward a matching stage in the center. There a two input AND gate conducts to identify the path where the two fan-outs collide. The output of a conductive AND gate is, therefore, the signal which selects the path which is to be completed.

The above mentioned and other features of this invention and the manner of obtaining them will become more apparent, and the invention itself will be best understood by reference to the following description of an embodiment of the invention taken in conjunction with the accompanying drawings, in which.

Figure 1:
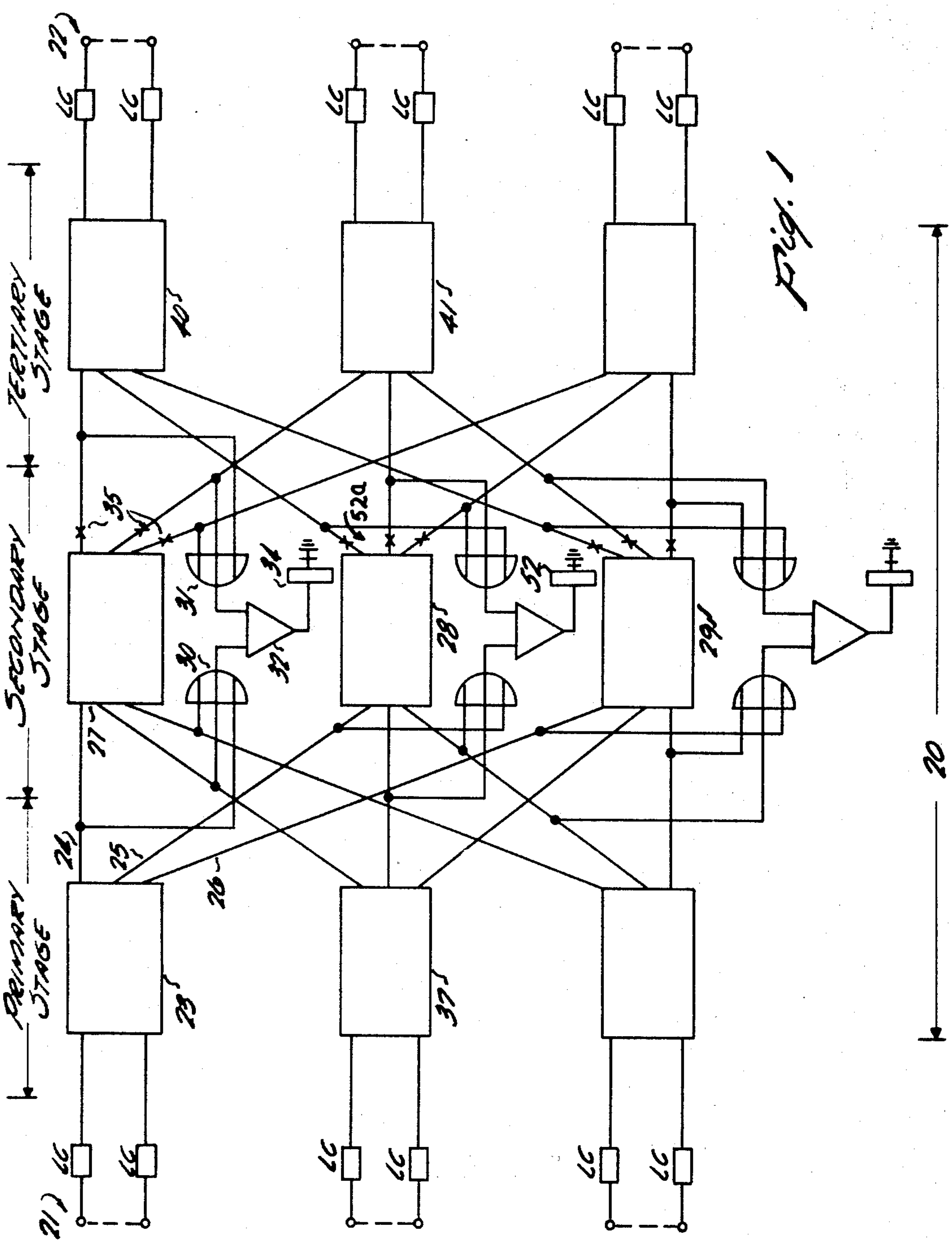
FIG. 1 is a block diagram which shows a cascaded series of matrices having demand circuits coupled to the ends thereof.

A network 20 is shown in FIG. 1 as comprised of a cascaded series of matrices. Demand circuits 21 are shown as connected via line circuits LC to the input side of the network where demand for switch paths originate. Other circuits 22 are shown as connected via line circuits LC to the other side of the network where the switch paths terminate. If the network 20 is part of a telephone switching system, demand circuits 21 are calling subscriber lines, and the other circuits 22 are either called subscriber lines, control links, registers, or the like. If the network 20 is part of a telegraph switching system, circuits 21 and 22 may be teleprinters; or, circuits 22 could be control links, registers, or the like.

The cascaded matrices are here designated "Primary Stage," "Secondary Stage," and "Tertiary Stage." Each primary stage in FIG. 1 has a different one of its outlets connected to an inlet on a different intermediate stage. For example, the outlets of the primary stage 23 are connected at 24, 25, 26 to an inlet on every one of the intermediate stages 27, 28, 29. This way the primary stage "sees" every intermediate stage. An inspection of FIG. 1 discloses that all of the other primary stage matrices are connected in a similar manner. An inspection also discloses similar connections between the outlets of the intermediate stage and the inlets of the tertiary stage.

The FIG. 1 disclosure is hypothetical. The exact number of inlets, outlets, stages, and interstage connections for any given network depends upon average traffic conditions through that network. However, in any system, there is no more than one path through any given center stage matrix which can connect the same two end stages.

To select a path which can be completed, each center stage has a two input AND gate associated therewith. For example, the OR gates 30, 31 are connected to the inlets and outlets of the center stages 27 to control a two input AND gate 32. The AND gate 32 conducts if there is an idle path through the center stage 27 associated with the AND gate. If the path extends from an end-marked primary matrix 23 to an end-marked tertiary matrix 40, the AND gate 32 conducts. Then, a relay 34 operates and closes its contacts 35. These contacts complete the path and allow a current to flow between the two end marked points. This current flow will preclude a later selection of the crosspoint which are now busy.

Figure 2:
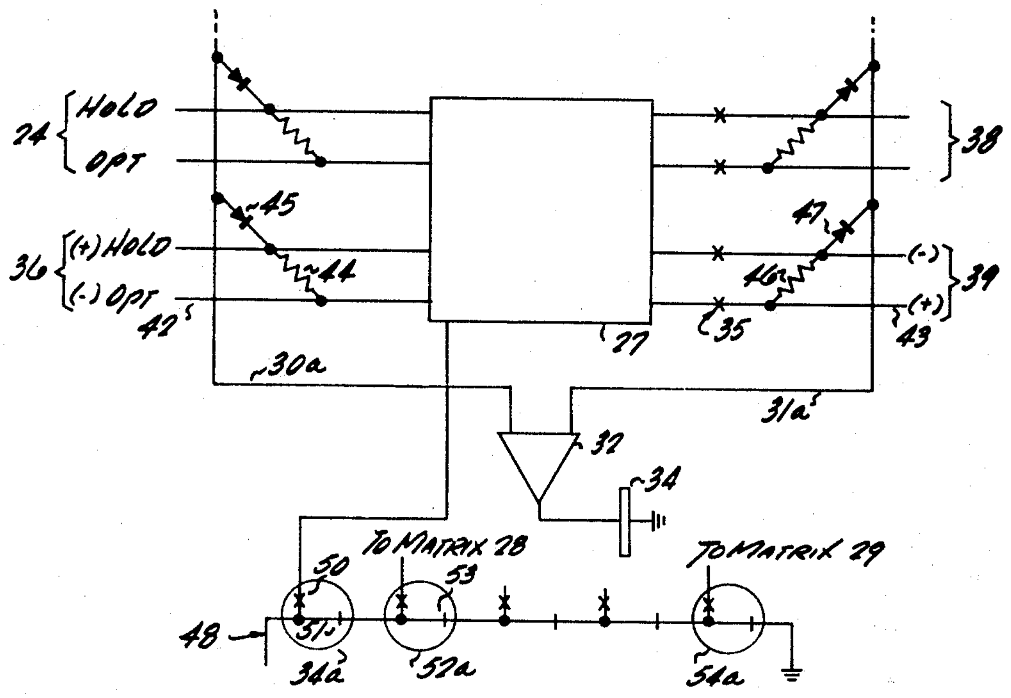
FIG. 2 is a block diagram which illustrates how the path selection is made in the center or matching stage.

The manner in which this busy marking functions will become more apparent from a study of FIG. 2. There shown is the same center stage matrix 27, AND gate 32, relay 34, and contacts 35. Two of the inlets 24, 36 of stage 27 connect to the primary stages 23, 37 as shown in FIG. 1. Likewise, the two outlets 38, 39 connect to the tertiary stages 40, 41 as shown in FIG. 1.

Each inlet and outlet includes two conductors designated "HOLD" and "OPT" (operate). The end-markings are applied to the "OPT" lead. A negative end-marking voltage which appears at inlet 42 is a high potential relative to a ground end-marking which appears at 43. The end-marking negative voltage at 42 is applied to the matrix 27 and through a resistor 44 and diode 45 to the AND gate input conductor **30*a*. The end-marking ground potential at 43 is applied through a resistor 46 and diode 47 to the other AND gate input conductor 31*a***.

The coincidence at the two inputs of the AND gate 32 is an indication that an idle path is available through the matrix 27. Therefore, relay 34 operates to close contacts 35 and thereby complete the desired path. When the path closes, a circuit is completed over the "HOLD" conductor. A suppressing high positive voltage source energizes the completed hold circuit.

Suppose next that after the path is completed, and therefore busy, the end-markings again appear at the inlet and outlet points 42, 43. The "HOLD" conductor has a high positive potential thereon because it is busy. The negative end-marking at inlet 42 is applied through the resistor 44 as it was applied when the path was idle. Now, however, the end-marking is overshadowed or masked by the positive voltage on the "HOLD" conductor which back biases the diode 45, and prevents it from conducting. For example, the end-marking potential may be (−) 48 volts and the voltage at the upper end of the resistor 44 may be (+) 10 volts. This is the (+) voltage which back biases the diode 45. Since the diode 45 is back biased, conductor **30*a* is not marked, and the AND gate 32 does not conduct. Relay 34 does not operate, contacts 35 do not close, and matrix 27** cannot be selected.

By making reference to FIG. 1, it is seen that there are three center stage matrices. Thus, it is necessary for the center stage which operates to seize control from the other center stages which do not operate. This preference results from operation of a chain of contacts 48 which appears in FIG. 2.

If it is assumed that matrix 27 is selected, relay 34 operates contacts **34*a*. Make contacts 50 close to enable matrix 27, and break contacts 51 open to preclude the enablement of another center stage matrix. If matrix 28 (FIG. 1) were selected, relay 52 would have operated contacts 52*a* to enable matrix 28 and opened contacts 53** to preclude the enablement of another center stage matrix.

Upon reflection, it should be apparent that the network of FIG. 1 is fully self-seeking. End-markings applied at the inlet of the primary stage and outlet of the tertiary stage result in the completion of a self-selected path through the network. The path is selected by the logical capabilities of the network itself, free of any external controls.

Figures 3, 3A:
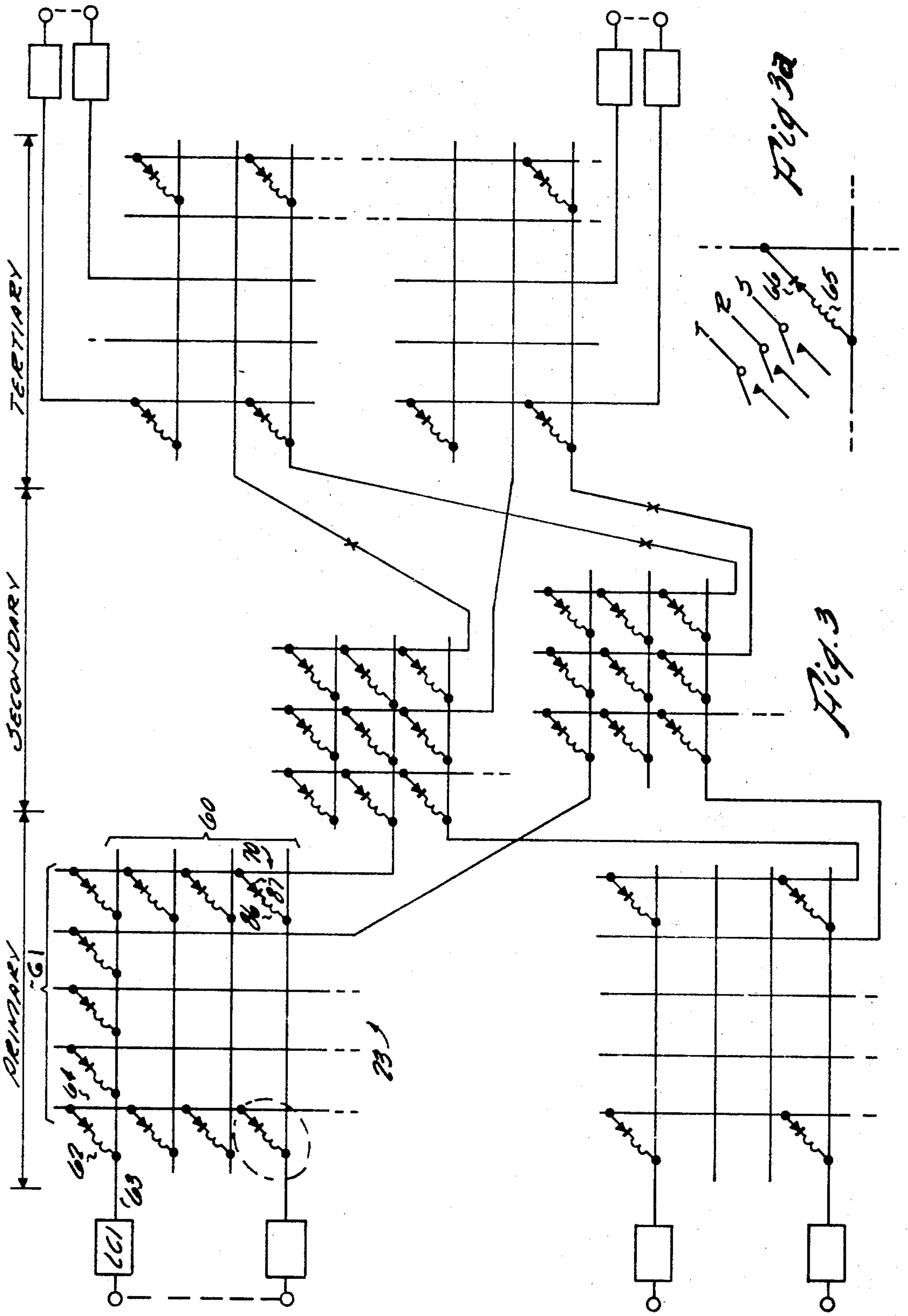
FIG. 3 is a schematic circuit diagram of the switching network which shows how the crosspoints are arranged.

The nature of the network construction may be more apparent from a study of FIG. 3 which shows the circuitry required to complete the hollow boxes of FIG. 1. Here again, a plurality of cascaded matrices are assembled to form a three stage switching network. Again the three stages are designated "Primary Stage," "Secondary Stage," and "Tertiary Stage."

Each matrix, such as 23, is a coordinate array comprising a plurality of horizontal busses 60 and vertical busses 61. Arbitrarily, these matrices are shown as 4 x 5, 3 x 3, and 5 x 3 matrices; actually any convenient size matrices may be used. Connected across each of the intersections of these busses is a crosspoint; for example, the crosspoint 62 is connected across the intersection of horizontal bus 63 and vertical bus 64.

FIG. 3*a* shows a single exemplary crosspoint taken from FIG. 3. Each crosspoint is a series circuit including the winding (such as 65) of a glass reed switch in series with a diode (such as 66). The diodes isolate the crosspoints connected to each vertical from each other. When a winding is energized (FIG. 3*a*), a set of glass reed contacts close to extend one or more message carrying circuits and, perhaps, control circuits as well. For example, if the network is part of a telephone system, these contacts could be the well known tip, ring, and sleeve. Both the windings and the glass reeds of the crosspoint are wired in the same configuration. Thus, the arrangement of the message conductors is that shown for the winding in FIG. 3. Therefore, it should be understood that the mention of a path through windings is equivalent to a description of the contacts themselves. For this reason, no further comments will be made relative to the contacts themselves.

The end-marking potentials applied at each side of the network fan out through the matrix. So that the fan out may be seen better, a part of the matrix of FIG. 3 is redrawn in FIG. 4. To orient the reader, the same reference characters identify the same parts in the FIGS. 1–4.

Figure 4:
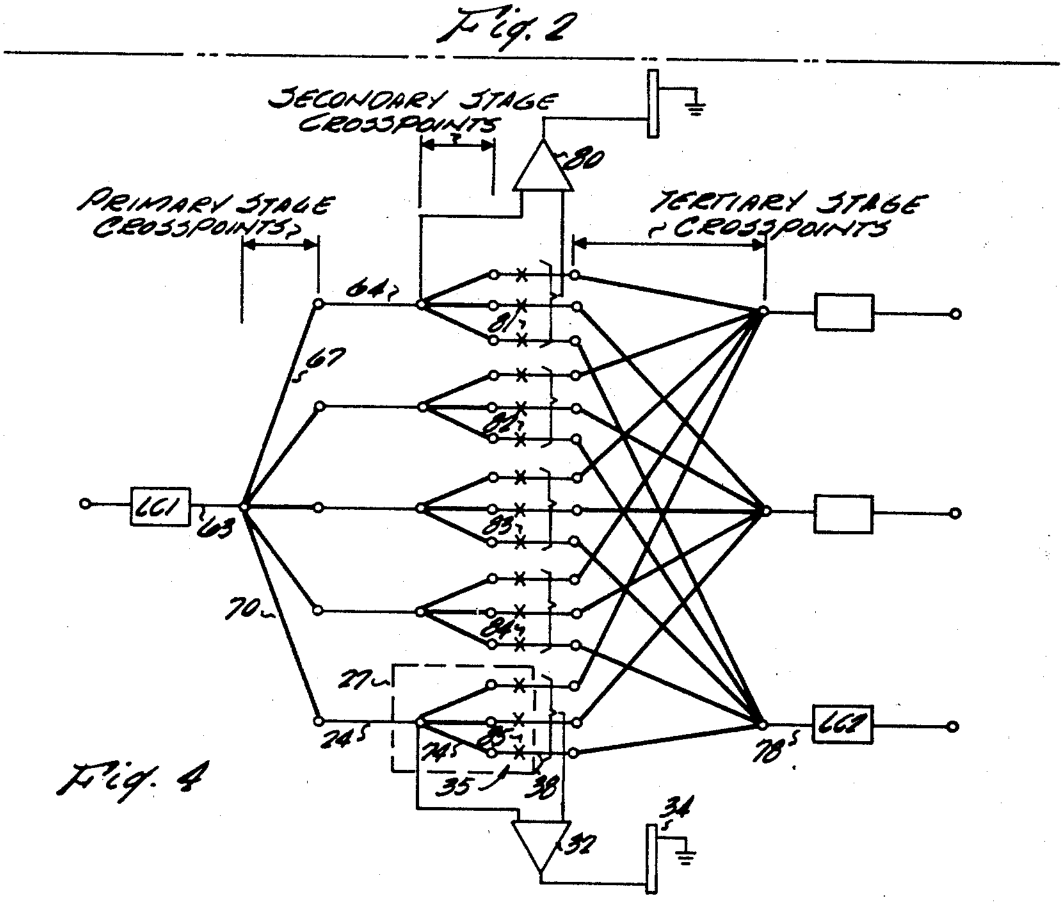
FIG. 4 is a graphical representation which shows how the end marking potentials fan out.

FIG. 4 shows selected ones of the crosspoints by heavily inked lines, as at 67, and the wires that inter-connect the crosspoints by lightly inked lines, as at 64. If the line circuit LC1 applies an end-marking potential of one polarity to the conductor 63, the potential is applied simultaneously over all of the paths shown in FIG. 4 to the left-hand side of open contacts, such as 35. If the line circuit LC2 applies an end-marking of opposite polarity to the conductor 78, it is applied over a fan-out toward the right-hand side of these open contacts. There is no offensive fan-out current, however, because these contacts are open.

Each of the center stages has an AND gate associated therewith, as explained in FIG. 2. However to avoid the confusion caused by an unduly complex drawing, only two such gates are shown at 32, 80. Other similar gates (not shown) will be provided for each center stage. If it is assumed that the crosspoints 81–84 are unavailable because of prior busy conditions, the only available path is via crosspoint 85 in center stage 27. Thus, AND gate 32 conducts, relay 34 operates, and contacts 35 close. Current flows over the path from line circuit LC1 through the components 63, 70, 24, 74, 35, 38, 76, and 78 to line circuit LC2.

The line circuits LC1 and LC2 detect the flow of current and remove the end-markings from the conductors 63, 78. The AND gate 32 ceases to conduct, relay 34 restores, and contacts 35 open. However, the path does not release because it has already locked up over another hold circuit. The manner of making this lock up is shown in FIG. 5.

Figure 5:
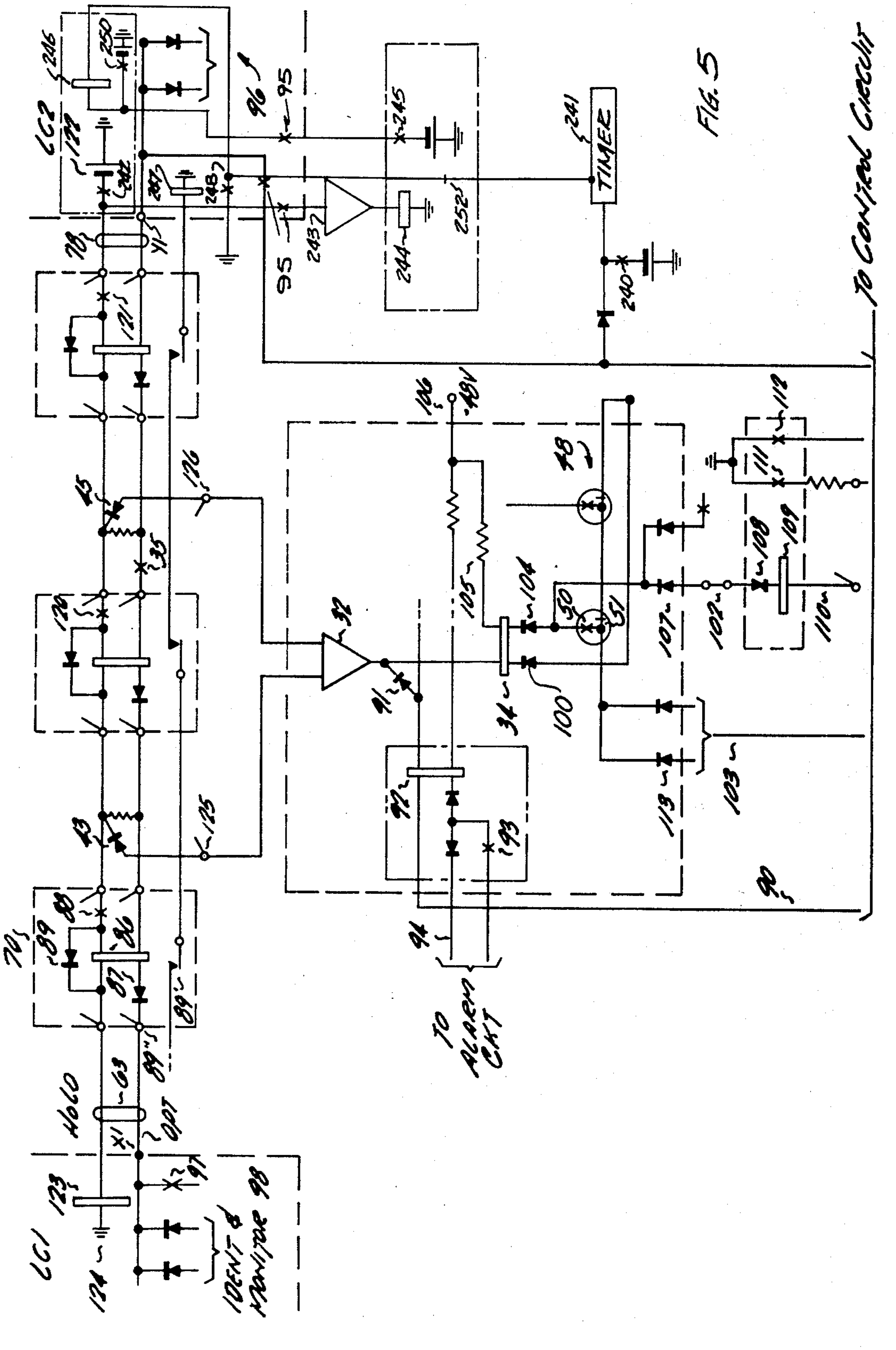
FIG. 5 is a schematic circuit diagram which shows the components of an exemplary path through the matrix.

FIG. 5 shows the crosspoints and associated components in the completed path. In this drawing, a dotted rectangle is used to show an association between related components. Thus, for example, a dotted rectangle 70 shows a crosspoint which includes the double windings 86 of the glass reed crosspoint relay, (the lower operate winding also appears in FIG. 3), the isolation diode 87 which is in series with the operate winding, a set of hold contacts 88 which lock the relay in its operated condition via its upper or hold winding. The diode 89 is for spark protection. The message circuit is closed through the contacts 89′ which are also part of the glass reed relay. The symbol at 89″ indicates the "horizontal" bus where other crosspoints are connected into the fan out circuit which is energized by the end-marking. The other crosspoints are constructed in a similar manner.

The center switch select chain 48 is shown in both of the FIGURES 2 and 5. In addition, FIG. 5 shows how certain path selector equipment may be added to partially control the network and thereby economically increase the size of the matrix.

The decision as to when a network should be built to be completely self-seeking (FIG. 2) or partial controlled (FIG. 5) is purely an economical one. The principle is that a number of cascaded matrices are associated together as shown in FIGS. 1–4 to provide a self-seeking network module. Then, to increase the size of the network, a number of these modules are assembled with common controls for selecting between the modules. The common control is an allotter which, upon demand, assigns the network module which is to be used to establish a call on a one-at-a-time basis. After a call is established, the allotter steps on to assign the network module which is to complete another call.

The operation of the partially controlled network will be understood best by a step-by-step description of how a call is set-up.

After one call has been completed and before the next call is begun, the common control circuit applies to an alarm lead 90. No center stage amplifier (such as 32) should be conducting at this time; therefore, nothing should happen at this time. On the other hand, if trouble has occurred and the previous path did not become established in a proper manner, a center stage amplifier may be conducting. A circuit extends up lead 90, through the winding of alarm relay 92, diode 91, and the conducting amplifier 32. This causes alarm relay 92 to operate, close a self-holding circuit at contacts 93, and give an alarm via lead 94. Any suitable circuit may be adapted to respond to the alarm in any suitable manner.

If there is no alarm condition, the common control circuit removes the potential from conductor 90. Then, the allotter closes contacts 95 to select and assign a circuit LC2 for use during the next call. Here it is assumed that circuit LC2 is a register.

Means are provided for timing the self-seeking search and giving an alarm or other indication of search failure if the search is not completed promptly. That is, after the contacts 95 close, the common control circuit closes contacts 240. A timer 241 starts to measure a time period that is long enough to complete a switch path plus a reasonable guard time. This could be in the order of 10–15 ms.

The closure of contacts 95 applies an end-marking potential to point Y1 and energizes a tens and units read out to identify the selected circuit LC2. For example, if a register No. "15" is assigned, the read out at 96 will be on a "1" tens lead and a "5" units lead. This read is provided for any desired reason, such as trouble shooting, for example.

Next, assume that circuit LC1 demands service. Responsive thereto, contacts 97 close in any known manner, as when a line relay operates. The line circuit demanding service is identified by a read out at 98, again for any desired functions. The potential applied via contacts 97 appears as an end-marking at the point X1.

The application at the points X1, Y1, of end-marking potentials causes a fan-out beginning at circuits LC1, LC2 and extending toward the center of the network, as disclosed in FIG. 4. A matching of the fan-out potential selects a desired path through the center stage by energizing the two input AND gate 32.

Means are provided for selecting one of the end-marked matrices modules. Since this FIG. 5 circuit is a larger network, a partial control over pass selection is made from the common control circuit. More specifically, the control circuit applies a potential over the conductor 103 to enable a path selection via the chain of contacts 48. The voltage from amplifier 32 is applied through the left-hand winding of relay 34, diode 100, chain of contacts 48, diode 113 and conductor 103 to the common control equipment. Relay 34 operates and closes its contacts 50 while opening its contacts 51 to prevent any other relay from operating. The resulting closure of contacts 35 causes all of the crosspoints and the selective path to operate (it makes no difference whether contacts 35 are left or right of the center stage). A holding circuit is completed from battery 106 through resistor 105, the right-hand winding of relay 34, diode 104, and the now closed contacts 50, to the common control circuit via diodes 101, 108, relay 109 and conductor 110.

Means are provided for guarding against double connections and against failures to close a selected path. More specifically, as each crosspoint relay operates, its associated "hold" path contact closes (i.e. contacts 88, 120, 121, close). The contacts 242 are open while the ground potential 124 is being advanced through the network. The amplifier 243 conducts when it receives ground over the path completed through the network to circuit LC2. This operates the relay 244 and closes the contacts 245 while opening the contacts 252. A circuit is now prepared to operate a relay 246.

When the crosspoints have closed their associated message carrying contacts (such as 89′), a relay 247 operates and closes its contacts 248. The relay 246 now operates from the battery applied through the contacts 245. It locks through its own contacts 250 and closes contacts 242. This completes the HOLD path through the upper windings of the crosspoints relays, which path may be traced from negative battery 122 through contacts 242, 121, 120, 88 and the winding of relay 123 to ground 124. The negative battery 122 turns off the amplifier 243 and releases the relay 244. Contacts 252 close to inhibit any further operation of the timer 241. The relay 123 operates to provide any switch through functions.

If, for any reason, an incorrect path selection has been made which would result in a double connection if completed, the guard circuit (components 242–250) will inhibit the completion of the hold path. This is because the negative potential of a battery (such as 122) on an already completed path is applied over the hold conductor to the amplifier 243. This negative potential inhibits relay 244 and holds the contacts 245 open.

The contacts 252 do not open; however, contacts 248 do not close. Therefore, no inhibiting potential can reach the timer 241. The timer times out and terminates the effort to complete this switch path. Either an alarm is given or new end-markings are applied to the network to cause another self-seeking search through the network, depending upon how the user wishes to have the circuit arranged.

In like manner, if the message path is not completed, the relay 247 does not operate, contacts 248 do not close, and relay 246 does not operate to close the hold path. Battery 122 does not reach the amplifier 243, and the timer 241 times out because contacts 248 and 252 remain open.

If the hold circuit is not completed, the potential of battery 122 does not reach the input of the amplifier 243, relay 244 does not release, and contacts 252 do not close. Again, the timer 241 times out with any desired results.

Means are provided for informing the control circuit that the path is completed. That is the voltage feeding up the conductor 103 passes through the closed contacts 50, diodes 107, 108, winding 109, and conductor 110 to the common control circuit. The relay 109 operates its contacts 111, 112 and signals the control circuit. The control circuit now knows that the relay 34 has operated because contacts 50 must have closed before relay 109 could operate. If the relay 34 (and therefore contacts 35) has operated, the switch path has closed.

The duplication of parts at 107, 111, 112, and 113 is because two common control circuits are provided for reliability and added switching capacity.

After the elapse of a period of time which is long enough to insure crosspoint operation and the lock up over the "HOLD" path, the common control circuit de-energizes the conductors 102, 103, 110. The relay 34 releases and contacts 35 open. The "OPT" path is open, and the matrix is ready to complete the next path.

The established path through FIG. 5 cannot be seized while it is busy because ground 124 back biases the diode 43, and battery 122 back biases the diode 45. Other idle paths can be completed through this same center stage if the diodes (not shown) connected at 125, 126, corresponding to diodes 43, 45, in the disclosed path are not then back biased in other paths.

The path is released when either ground 123 or battery 122 is removed.

Figures 6, 7:
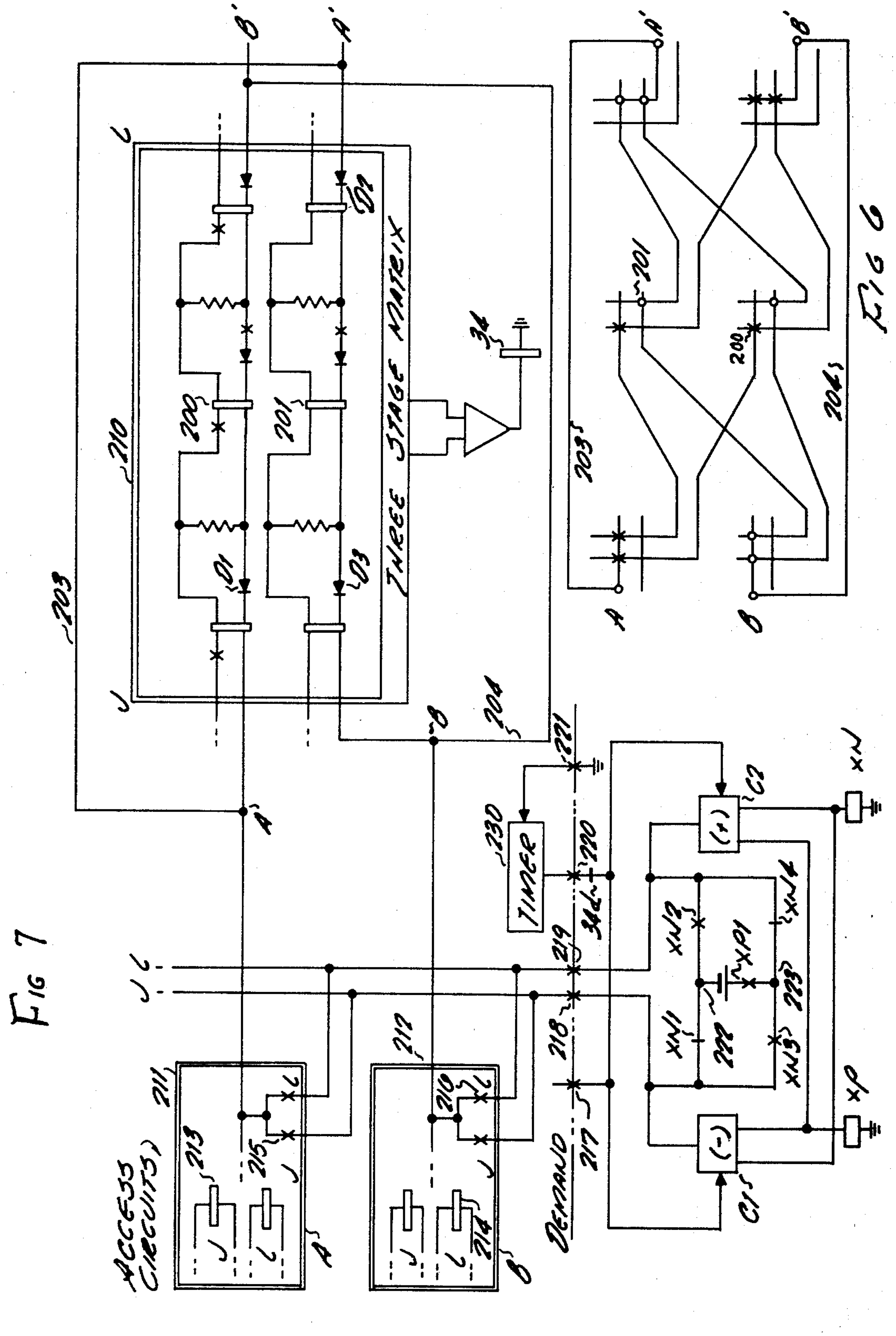
FIG. 6 is a schematic circuit diagram which shows a folded switching network.
FIG. 7 is a circuit drawing showing how the self-seeking glass reed matrix is controlled to provide a folded network.

FIGS. 6 and 7 show a further sophistication called a folded matrix. To understand the principle of a folded matrix consider FIG. 6 (a network schematic similar to that of FIG. 3—explained above). It is apparent that all circuits served by the network must be connected to both sides of the network if they are to both send and receive signals (i.e. each line would have an originate or finder access and a terminate or connector access).

Good network design spreads the possible switch paths so that all lines have equal access to each other. For example, if line A calls line B, the call normally originates at the originate terminal A and terminates at terminal B′. One possible path between terminals A and B′ includes crosspoints 200. Other possible paths between terminals A and B′ include the crosspoints marked by an "X." In like manner, a possible path from originate terminal B to terminate terminal A′ includes the crosspoint 201, and other possible paths include the crosspoints marked by an "O."

In a non-folded network a call originating at line A could not use the crosspoint 201 (or any crosspoint marked by an "O") to terminate at line B′. In like manner, a call through a non-folded matrix originating at line B could not use the crosspoint 200 (or any crosspoint marked by an "X") to terminate at line A′.

In a folded network, each line has its originate and terminate terminals connected together. For example, the wire 203 interconnects the originate and terminate terminals A, A′, and the wire 204 interconnects the originate and terminate terminals B, B′. If line A demands a path to line B, initially the wire 203 is effectively open. A search is first from left to right over the crosspoints marked by an "X," such as 200. Assume that none of these crosspoints are idle, and the path cannot be completed in the left to right direction.

After a period of time which is long enough to complete a search over the crosspoints marked by an "X," the wire 203 is effectively closed. Then another search is made from right to left through the crosspoint 201 and similar crosspoints marked by an "O." If it is assumed that crosspoint 201 is idle, the path is extended from originate point A, over wire 203 to terminate point A′, and through a path including crosspoint 201 to the originate point B. By an inspection of FIG. 6, it should be apparent that there are twice as many effective crosspoints in a folded network as there are in a non-folded network.

The manner of providing a folded network with the inventive self-seeking glass reed network should be apparent from a study of FIG. 7. There, the previously described self-seeking network appears at 210. The originate and terminate terminals A, B, A′, B′, wires 203, 204, and crosspoints 200, 201 are the same as those which appear in FIG. 6. For identification purposes the letter J is used throughout FIG. 7 to indicate the left-hand side of the network and the normal left-to-right direction of searching. The letter L is used to indicate the right-hand side of the network and the folded right-to-left direction of searching.

Assume that station A is calling station B. The calling circuit 211 is identified by its demand; directory number signals transmitted from the calling station are decoded to identify the called circuit 212. Since station A is calling, J relay 213 operates. Likewise, L relay 214 operates since station B is called. If station B had called station A, the upper "L" relay and lower "J" relay would have operated. Under the assumptions that relays 213, 214 operate, contacts 215, 216 are closed.

Then the contacts 217–221 marked "Demand" are closed. The contacts 217 cause the control circuits C1, C2 to operate relay XP and the contacts XP1 to close. A circuit may be traced from the negative potential point 222, through contacts XN1, 218, 215, through the diode D1 (and similar diodes), wire 204, contacts 216, 219, XN4, and XP1 to a positive potential. The diode D2 prevents the negative potential on wire 203 from entering the network. The diode D3 keeps the positive potential at contacts 216 from entering the network. This time the search is over the crosspoints marked by an "X" in FIG. 6.

If the demanded path is completed from terminal A to terminal B′, relay 34 operates and contacts 34*d* open. The end-marking potentials 222, 223 are removed when relays 213, 214 release to open contacts 215, 216.

Means are provided for reversing the direction of searching to provide a folded network. In greater detail, the contacts 221 start a timer 230 when the demand for service is placed by the calling line. If a path is not completed, relay 34 does not operate and contacts 34*d* do not open. After a period of time which is long enough to complete a path in the left-to-right direction, the timer 230 times out and applies a potential through the contacts 220, 34*d*. The control circuits C1, C2 respond by operating the relay XN. The contacts XN1 open to remove the negative potential from the J wire, and contacts XN2 close to apply it to the L wire. In a similar manner, contacts XN4 open to remove the positive potential from the L wire while contacts XN3 close to apply it to the J wire. Thus, the end-markings are applied over a path traced from negative potential point 222 through contacts XN2, contacts 219, 216, diode D3, the matrix 210, diode D2, wire 203, contacts 215, XN3, and XP1 to the positive terminal of the battery. This time the search is over the crosspoints marked by an "O" in FIG. 6.

The system may be further enlarged without changing the character of the invention. Thus, if five switching stages are required, the three stage network disclosed in the foregoing specification becomes the center stage, as at 27 in FIG. 1. Then, two additional stages are added to provide primary and tertiary stages and thereby make a network having a total of five stages. If seven stages are required, the five stage network is treated as the center stage 27 of a seven stage network. Two additional stages are added for primary and tertiary stages.

While there are no theoretical limits on how large the system may be made by this technique, there may be practical limitations. When this point of practical limitation is reached, the circuits 22 become control links and another switching network, such as is shown in FIG. 1, is connected in cascade.

Thus, the invention provides a number of options by which the network may be enlarged without causing an economic discontinuity because of changes in economy of scale.

The advantages of the invention should now be clear to those skilled in the art. First, gold plated glass reed contacts are sealed in an envelope containing an inert atmosphere. Therefore, low current and dry contact circuits may be switched without the danger of pitting and corrosion. Second, the nature of the signals passing through the network has no effect upon the switching of the matrix. Therefore, wide band and narrow band circuits may be intermixed. Third, the idle test is a positive test. If a circuit opens (i.e. a wire breaks, diode burns out, etc.), the AND condition does not appear and thus the path is automatically not available for traffic. Fourth, the built in alarms detect failures and allow maintenance people to find and detect faults. For example, if crosspoints fail to close when selected, a timer times out and gives an alarm. Since the self-seeking paths search through all crosspoints any crosspoint failures are detected quickly and systematically. Likewise, positive alarms occur if double connections are made. Fifth, after a free path has been found (by the positive test of the AND condition) all crosspoints in the path are energized simultaneously by the end marked series connection through the operate windings, thus saving common equipment time as compared to other systems which extend paths through the matrix stage-by-stage. Still other advantages will readily occur to those skilled in the art.

While the principles of the invention have been described above in connection with specific apparatus and applications, it is to be understood that this description is made only by way of example and not as a limitation on the scope of the invention.

I claim:

1. An automatic switching system comprising a plurality of cascaded matrices, each matrix being made from intersecting horizontal and vertical busses, crosspoint means including a series circuit of a winding of a glass reed relay and a diode connected across each of these intersections, means for applying end-marking potentials at opposite sides of the network cascade to cause a fan out beginning at the end-marked points and extending through the network toward a matching stage in the center of the network, a two input AND gate means coupled across the center stage in said network to identify the path where the two fan outs collide, and means responsive to the output of a conductive AND gate for immediately completing the path through the system which is thus identified.

2. The system of claim 1 wherein said cascaded matrices are arranged in a folded network with each network inlet having its originate and terminate terminals connected together, means responsive to the application of said end-marking potentials for searching through said network in a first direction, means for measuring a period of time that is long enough to complete a path if the crosspoints available to said search are idle, and means responsive to the termination of said time period for making another search through said network in the opposite direction.

3. The system of claim 1 and means for terminating the conductive output of said AND gate when said path is completed, an alarm circuit, means responsive to the output of said AND gate for applying a first potential to said alarm circuit, means responsive to the completion of said path for applying a second potential to said alarm circuit, and means responsive to a coincidence of said first and second potentials for giving an alarm if said AND gate remains on after said path is completed.

4. The system of claim 1 wherein said means responsive to the output of the conductive gate for selecting the path which is to be completed through the system comprises a selection chain, allotter means, means for utilizing said selection chain for selecting the path until the number of glass reed relays exceeds a predetermined number, and means for thereafter using said common allotter in conjunction with said selection chain to control the path selected.

5. An automatic switching network comprising a plurality of cascaded matrices made from two winding glass reed relay crosspoints, each of said matrices including intersecting horizontal and vertical busses arranged to provide operate conductors and associated hold conductors, each crosspoint including one of the windings of a glass reed relay and a diode connected in series across each of the intersections of operate conductors, means for applying end-marking potentials of opposite polarity to the operate conductors at the opposite ends of a desired switch path to cause a fan-out of potentials through said crosspoints, resistive means coupled across said associated conductors at each of said matrices for applying the end-marking to the hold conductor associated with the marked operate conductor, diode means coupled to pass the resistively applied end-marking potential from the hold conductor to a path selecting AND gate, means responsive to a coincidence of markings at the AND gate for simultaneously closing an operate circuit for operating all of the glass reed relays having a winding in series with the marked and selected operate conductor, means responsive to the operation of each of these glass reed relays having a winding in series with the marked and selected operate conductor for closing a circuit through the other of the windings of said operated relays in series with the associated hold conductor extending from the marked inlet to the marked outlet, and means responsive to a completion of the path through the hold conductor and said other windings for applying potentials to the hold conductor which back bias said diodes and thereby preclude response to any later applied end-markings.

6. The network of claim 5 wherein said cascaded matrices are arranged in a folded network with each network inlet and outlet having access to a common circuit being connected together, means responsive to said end-marking potential for searching through said network in a first direction, means for measuring a period of time that is long enough to complete a path if the crosspoints are idle, and means responsive to the termination of said time for making another search through said network in the opposite direction.

7. An automatic switching network comprising a plurality of cascaded matrices made from two winding glass reed relays, each matrix having intersecting horizontal and vertical busses with crosspoints including one of the windings of a glass reed relay, means for applying end-marking potentials of opposite polarity to the opposite ends of a desired switch path, means at each of said matrices for applying the end-marking through a diode to a path selecting gate to operate said gate, means responsive to the operation of said gate for simultaneously closing an operate circuit for operating all of the glass reed relays having a winding in series with the marked and selected point, means responsive to the operation of each of these glass reed relays for closing a holding circuit through the other of the windings of said operated relays, and means responsive to the completion of the hold path for applying potentials to back bias said diodes.

8. An automatic switching system comprising a plurality of cascaded matrices, each matrix being made from intersecting horizontal and vertical busses, crosspoint means including a series circuit of a winding of a glass reed relay and a diode connected across each of these intersections, each of said glass reed relays having message carrying conductors, means for applying end-marking potentials at opposite sides of the network cascade to cause a fan-out of potentials through said crosspoints, the fan-out beginning at the end-marked points and extending through the network toward a matching stage in the center of the network, timer means for measuring a period of time beginning with said application of said end-marking potential and continuing long enough to complete a switch path through said matrix, means for guarding against completion of double connections and failures to close a select path through said network, means responsive to a match at said matching stage before said timer times out for completing a path, and means responsive to said timer timing out before said guard means indicates a completion of a path through said network for terminating said self-seeking search.

9. An automatic switching network comprised of a three stage cascaded series of matrices, demand circuit means connected to the inlet side of the network where demands for switch paths originate, other circuit means connected to the outlet side of the network where the switch paths terminate, each primary stage in said cascade having a different one of its outlets connected to an inlet on a different intermediate stage so that each of the primary stages has access to every intermediate stage, each intermediate stage in said cascade having a different one of its outlets connected to an inlet on a different one of the tertiary stages so that each of the intermediate stages has access to every tertiary stage, means comprising a pair of OR gates being connected to the inlets and the other of said OR gates being connected to the outlets of the intermediate stages, timer means, means responsive to one of said demand circuits and other circuits for applying a potential to said OR gates and said timer, a two input AND gate means coupled to be energized when a pair of said OR gates conduct simultaneously to select a path which can be completed through the intermediate stage where the conductive OR gates coincide, and means responsive to said timer timing out before said path is completed for indicating a failure to complete said path.

10. An automatic switching network comprising a plurality of cascaded matrices made from two winding glass reed relays, each relay having a message carrying set of contacts, each matrix having intersecting horizontal and vertical busses with crosspoints including one of the windings of a glass reed relay, timer means, means for starting said timer and for applying end-marking potentials of opposite polarity to the opposite ends of a desired switch path, means responsive to a matching of paths fanning-out from said end-markings for operating all of the glass reed relays having a winding in series with the path where the match occurs, means responsive to the operation of each of these glass reed relays for closing a holding circuit through the other of the windings of said operated relays and for closing a message circuit through said message carrying set of contacts, and guard means responsive to the timer timing out before completion of the path for indicating a failure of said switch path to be completed.

11. The network of claim 10 and means responsive to said timer timing out before said holding path closes for indicating a failure of said switch path to be completed.

12. The network of claim 10 and means responsive to said timer timing out before said message circuit closes for indicating a failure of said switch path to be completed.

13. An automatic switching system comprising a plurality of cascaded matrices, each matrix being made from intersecting horizontal and vertical multiples, crosspoint means including glass reed relays connected across each of these intersections, means for applying end-marking potentials at opposite sides of the network cascade to cause a fan-out of potentials through said crosspoints, the fan-out beginning at the end-marked points and extending through the network toward a matching stage in the center of the network, two input AND gate means coupled across the center stage in said network to identify the path where the two fan-outs collide, means responsive to the output of a conductive AND gate for immediately completing the path through the system which is so identified, and means responsive to the selection of said path for thereafter suppressing the effects of said end-marking potentials at the inputs of said AND gate to preclude the selection of a busy path.

14. The system of claim 13 wherein each of said matrices has associated hold and operate conductors at each horizontal and vertical, the end-markings being applied with a first polarity orientation to said operate conductors, said means responsive to the output of said AND gate selecting the path where the end-marked potentials coincide on said operate conductors, means responsive to said selection for completing a path with an opposite polarity orientation via the hold conductor associated with the selected operate conductor, and said end-marking suppression means including means responsive to the completion of said hold conductor path for thereafter masking said end-marking by applying voltages of said opposite polarity orientation to the two inputs of said AND gate.

15. The system of claim 13 wherein said plurality of cascaded matrices are made from two winding glass reed relays, each relay having a message carrying set of contacts, said intersecting horizontal and vertical busses including connections to one of the windings of a glass reed relay, means responsive to said collision of the paths fanning out from said end-markings for operating all of the glass reed relays having a winding in series with the path where the collision occurs, and means responsive to the operation of each of these glass reed relays for closing a holding circuit through the other of the windings of said operated relays and for closing a message circuit through said message carrying set of contacts, said suppression means being made effective responsive to the completion of the holding circuit.

16. The system of claim 13 wherein said cascade of matrices forms a plurality of inlets and outlets with said crosspoints therebetween, each of said inlets and outlets of said stage includes an operate and a hold conductor, means for applying said end-marking potentials with a given polarity orientation to the opposite ends of the operate conductor at the inlet and outlet of a desired switch path, resistive means coupled across said operate and hold conductors at each side of said matching stage for resistively applying the end-marking potential on the operate conductor to the hold conductor, diode means coupled to pass the resistively applied end-marking potential from the hold conductor to a corresponding input of said AND gate, said means responsive to the output of said AND gate closing path through said switching stage via said hold conductor, and means effective after said closure of said hold conductor for applying potentials of polarities which are opposite to the orientation of said end-marking to back bias said diode means and thereby accomplish said suppression of said end-marking signal.

17. An automatic switching network comprised of a three stage cascaded series of matrices, demand circuit means connected to the inlet side of the network where demands for switch paths originate, other circuit means connected to the output side of the network where the switch paths terminate, each primary stage in said cascade having a different one of its outputs connected to an inlet on a different intermediate stage so that each of the primary stages has access to every intermediate stage, each intermediate stage of said cascade having a different one of its outlets connected to an inlet on a different one of the three stages so that each of the intermediate stages has access to every tertiary stage, means comprising a pair of OR gates at each intermediate stage, one of said OR gates being connected to the inlets and the other of said OR gates being connected to the outlets of the intermediate stages, and a two input AND gate coupled to be energized when a pair of said OR gates conduct simultaneously to select a path which can be completed through the intermediate stage where the conductive OR gates coincide, means for terminating the energization of said AND gate when said path is completed, an alarm circuit, means responsive to the energization of said AND gate for applying a first potential for said alarm circuit, means responsive to the completion of said path for applying a second potential for said alarm circuit, and means responsive to a coincidence of said first and second potentials for giving an alarm if said AND gate remains on after said path is completed.

References Cited

UNITED STATES PATENTS

| | | | |
|---|---|---|---|
| 3,175,043 | 3/1965 | Jabczynski et al. | 179—22 |
| 3,288,939 | 11/1966 | Spellnes. | |
| 3,310,633 | 3/1967 | Schonemeyer. | |
| 3,342,947 | 9/1967 | Bock | 179—18.7 |

KATHLEEN H. CLAFFY, *Primary Examiner.*

ALBIN H. GESS, *Assistant Examiner.*

U.S. Cl. X.R.

340—166